United States Patent
Le Guludec et al.

(10) Patent No.: US 11,021,366 B2
(45) Date of Patent: Jun. 1, 2021

(54) HELIUM PURIFICATION PROCESS AND UNIT

(71) Applicant: L'Air Liquide, Societe Anonyme pour l'Etude et l'Exploitation des Procedes Georges Claude, Paris (FR)

(72) Inventors: Erwan Le Guludec, Paris (FR); Antoine Hernandez, Paris (FR)

(73) Assignee: L'Air Liquide Société Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/894,205

(22) Filed: Jun. 5, 2020

(65) Prior Publication Data

US 2020/0385269 A1    Dec. 10, 2020

(51) Int. Cl.
| | |
|---|---|
| *F25J 3/06* | (2006.01) |
| *C01B 23/00* | (2006.01) |
| *B01D 53/047* | (2006.01) |
| *B01D 53/04* | (2006.01) |
| *B01D 5/00* | (2006.01) |
| *B01D 3/14* | (2006.01) |

(52) U.S. Cl.
CPC .......... *C01B 23/0094* (2013.01); *B01D 3/143* (2013.01); *B01D 5/0057* (2013.01); *B01D 53/047* (2013.01); *B01D 53/0462* (2013.01); *C01B 23/0021* (2013.01); *C01B 23/0078* (2013.01); *F25J 3/069* (2013.01); *B01D 2257/80* (2013.01); *B01D 2259/402* (2013.01); *C01B 2210/007* (2013.01); *C01B 2210/0031* (2013.01); *C01B 2210/0046* (2013.01); *C01B 2210/0053* (2013.01)

(58) Field of Classification Search
CPC ... C01B 23/00; C01B 23/001; C01B 23/0036; C01B 23/0052; C01B 23/0078; C01B 23/0094; C01B 23/221; C01B 23/0031; C01B 2210/0046; C01B 2210/0053; C01B 2210/007; F25J 3/04642; F25J 3/069; F25J 2215/30; F25J 2220/00
See application file for complete search history.

(56) References Cited

U.S. PATENT DOCUMENTS

| | | | |
|---|---|---|---|
| 5,085,674 A * | 2/1992 | Leavitt | B01D 53/047 95/98 |
| 5,224,350 A * | 7/1993 | Mehra | B01D 53/229 62/624 |
| 10,036,590 B2 * | 7/2018 | Ploeger | F25J 3/067 |
| 10,215,488 B2 | 2/2019 | White et al. | |
| 2008/0134716 A1 * | 6/2008 | Larass | C01B 21/0405 62/617 |
| 2018/0238618 A1 * | 8/2018 | Demolliens | C01B 23/00 |

FOREIGN PATENT DOCUMENTS

| | | | | |
|---|---|---|---|---|
| CN | 112013385 A | * | 12/2020 | ............. F23D 14/02 |
| EP | 3 315 463 | | 5/2018 | |
| GB | 935951 A | * | 9/1963 | ......... C01B 21/0411 |

OTHER PUBLICATIONS

French Search Report for FR 1906005, dated Jan. 23, 2020.

* cited by examiner

*Primary Examiner* — Timothy C Vanoy
(74) *Attorney, Agent, or Firm* — Christopher J. Cronin

(57) ABSTRACT

In a helium purification process, a stream containing at least 10% of helium, at least 10% of nitrogen in addition to hydrogen and methane is separated to form a helium-enriched stream containing hydrogen, a first stream enriched in nitrogen and in methane and a second stream enriched in nitrogen and in methane, the helium-enriched stream is treated to produce a helium-rich product and a residual gas containing water, the residual gas is treated by adsorption (TSA) to remove the water and the regeneration gas from the adsorption is sent to a combustion unit (O).

11 Claims, 1 Drawing Sheet

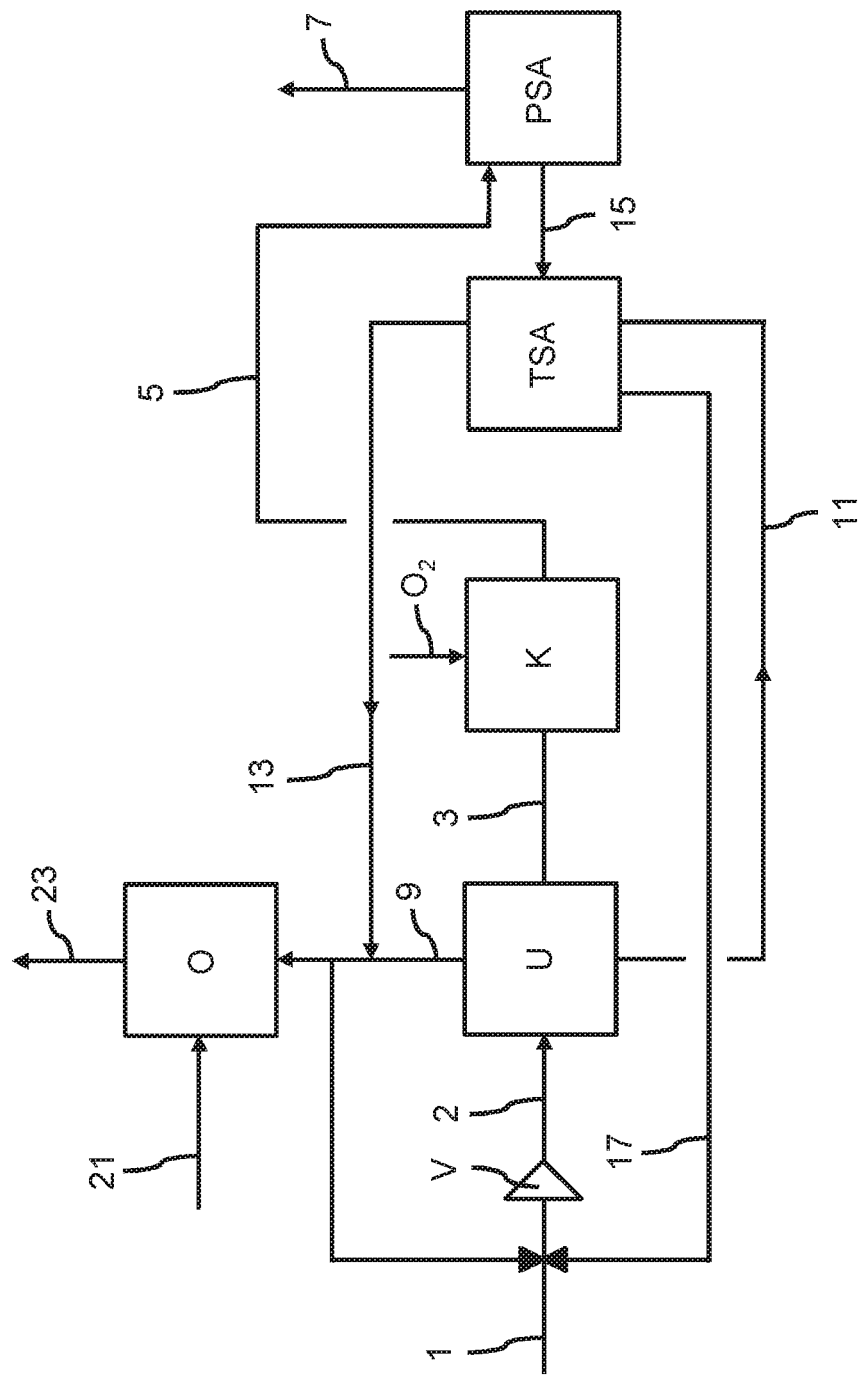

HELIUM PURIFICATION PROCESS AND UNIT

CROSS-REFERENCE TO RELATED APPLICATIONS

This application claims the benefit of priority under 35 U.S.C. § 119 (a) and (b) to French patent application No. FR 1 906 005, filed Jun. 6, 2019, the entire contents of which are incorporated herein by reference.

BACKGROUND

Field of the Invention

The present invention relates to a process and a unit for purifying helium.

The helium content in the treated gas is greater than 10%, preferably greater than 30% (mol %). The treated gas also contains nitrogen. The nitrogen content is greater than 10%, preferably greater than 30%. The treated gas may also contain minor compounds such as carbon monoxide, carbon dioxide, methane, hydrogen, neon, etc.

Related Art

Helium is treated in several steps. The steps may be the following:
1. Compression of the feed gas.
2. Enrichment up to a content of 70-90 mol % of helium by means of a "partial condensation" cryogenic process.
3. Removal of the hydrogen contained in the gas by means of a catalytic process.
4. Purification up to a content of 99.99 mol % of helium using a PSA.

If the gas to be separated is under pressure, the compression step is obviously not present.

The purified helium may then be liquefied.

SUMMARY OF THE INVENTION

The process of the present invention may be integrated into a helium purification and liquefaction unit, HeRU (Helium Recovery Unit).

The residual gas from the PSA may be sent to the compressor to recover the helium it contains. The residual gas is purified upstream of the compressor in a TSA before being introduced into the purification process. The TSA takes up the water and the $CO_2$ contained in the residual gas from the PSA.

To regenerate the TSA, nitrogen produced by the cryogenic process is used, and the nitrogen, which contains a few % of methane, is then discharged into the atmosphere.

The present invention seeks to reduce the amount of methane, originating from this regeneration gas, which is discharged into the atmosphere.

According to one subject of the invention, a helium purification process is provided, in which:

i) a stream containing at least 10% of helium, at least 10% of nitrogen in addition to hydrogen and methane and either not containing any carbon dioxide or containing carbon dioxide as minor component is separated by partial condensation and/or distillation to form a helium-enriched stream containing hydrogen, a first stream enriched in nitrogen and in methane and a second stream enriched in nitrogen and in methane, ii) the helium-enriched stream is sent to a catalytic unit in the presence of oxygen to reduce its hydrogen content, the helium-enriched and hydrogen-depleted stream is treated to remove at least part of the water generated by the catalysis, the helium-enriched stream from which part of the water has been removed is purified by adsorption in a first adsorption unit to produce a helium-rich gas comprising at least 95 mol % of helium and a helium-depleted residual gas containing water, iii) the helium-depleted residual gas containing water is separated by adsorption in a second adsorption unit to remove the water, iv) the first stream enriched in nitrogen and in methane is sent to a combustion unit to participate in combustion and the combustion gases are discharged to the atmosphere or recovered, v) the second stream enriched in nitrogen and in methane is sent as regeneration gas to the second adsorption unit and the gas which served for the regeneration is sent to the combustion unit to participate in combustion.

According to other optional aspects:
- the residual gas from which water is removed in the second adsorption unit is sent to the separation process.
- the residual gas and the gas to be separated are compressed upstream of the separation unit in the same compressor.
- the first and second streams enriched in nitrogen and in methane have the same composition.
- the stream containing at least 10% of helium, at least 10% of nitrogen in addition to hydrogen and methane separated by partial condensation and/or distillation contains at least 30 mol % of helium, or even at least 40 mol % of helium.
- the second stream enriched in nitrogen and in methane sent as regeneration gas to the second adsorption unit contains at least 85 mol % of nitrogen.
- the second stream enriched in nitrogen and in methane sent as regeneration gas to the second adsorption unit contains at least 1 mol % of methane.
- the second adsorption unit is a temperature swing adsorption unit.
- the gas which served for the regeneration is mixed with the first gas enriched in nitrogen and in methane upstream of the combustion.
- according to one operating mode of the apparatus, at least part of the first gas enriched in nitrogen and in methane is sent to the separation process.
- the stream does not contain any C2+ hydrocarbons.
- the helium-enriched and hydrogen-depleted stream is treated to remove at least part of the water generated by the catalysis by cooling it to condense the water.

According to another subject of the invention, a helium purification unit is provided, comprising a unit for separation by partial condensation and/or by distillation, a catalytic unit, a first adsorption unit, a second adsorption unit, a combustion unit, means for sending a stream containing at least 10% of helium, at least 10% of nitrogen in addition to hydrogen and methane and either not containing any carbon dioxide or containing carbon dioxide as minor component to be separated by partial condensation and/or distillation in the separation unit to form a helium-enriched stream containing hydrogen, a first stream enriched in nitrogen and in methane and a second stream enriched in nitrogen and in methane, means for sending the helium-enriched stream to a catalytic unit in the presence of oxygen to reduce its hydrogen content, means for treating the helium-enriched and hydrogen-depleted stream to remove the water generated by the catalysis, means for sending the helium-enriched stream to the means for treating to remove water, means for sending the helium-enriched stream from which water has been removed to the first adsorption unit to separate it by adsorption to produce a helium-rich gas comprising at least 95 mol % of helium and a helium-depleted residual gas, means for sending the helium-depleted residual gas containing water to be separated by adsorption in the second adsorption unit to remove the water, means for sending the first stream enriched in nitrogen and in methane to the combustion unit to participate in combustion, means for discharging the combustion gases to the atmosphere or for sending them to a recovery unit, means for sending the second stream enriched in nitrogen and in methane as regeneration gas to the second adsorption unit and means for sending the gas which served for the regeneration to the combustion unit to participate in combustion.

BRIEF DESCRIPTION OF THE FIGURES

The invention will be described in a more detailed manner with reference to FIG. 1.

FIG. 1 illustrates a process according to the invention.

DETAILED DESCRIPTION OF THE INVENTION

A stream 1 comprising at least 10 mol %, preferably at least 30 mol % of helium and at least 10 mol % of nitrogen and also methane and hydrogen is compressed in a compressor V and sent to low-temperature separation apparatus U where it is separated by means of at least one step of partial condensation optionally with distillation. This separation takes place at a cryogenic temperature. The stream 1 does not contain any carbon dioxide or contains carbon dioxide as minor component.

This apparatus U produces a stream 3 enriched in helium and in hydrogen but depleted in nitrogen and in methane, a first stream 9 enriched in nitrogen and in methane and a second stream 11 enriched in nitrogen and in methane. Streams 9 and 11 may have the same composition. Stream 3 contains at least 30 mol % of helium, or even at least 40 mol % of helium or even a content of 70-90 mol % of helium. Stream 9 and/or 11 contains at least 85 mol % of nitrogen, or even at least 90 mol % of nitrogen.

Stream 3 is stripped of hydrogen by catalysis in the unit K in the presence of oxygen, thus producing water vapour. Stream 5, obtained from the catalytic process, contains helium, water vapour, nitrogen and methane. This stream 5 is treated to remove part of the water by cooling it so that part of the water condenses, or via other means. Stream 5 from which the condensed water has been removed is then purified by adsorption in the pressure swing adsorption PSA apparatus to produce helium 7 at 99.99 mol %. Another type of adsorption apparatus can replace the pressure swing adsorption.

The residual 15 from the PSA adsorption apparatus is depleted in helium relative to stream 5 and contains water and possible traces of $CO_2$. The residual 15 is separated by adsorption in a temperature swing adsorption TSA unit to remove the water and the possible traces of $CO_2$. Another type of adsorption apparatus can replace the temperature swing adsorption.

The gas 15 is not compressed between the two adsorption steps. The gas produced, gas 17, is optionally sent upstream of the compressor V to recover the helium it contains by separation in the apparatus U.

To regenerate this TSA apparatus, the gas stream 11 enriched in nitrogen and in methane from the apparatus U is used. The gas which served for the regeneration, gas 13, contains water, and is mixed with the first stream 9 enriched in nitrogen and in methane. The two gases are sent for combustion in the unit O (which may be a torch) in the presence of oxygen 21 optionally provided by air. This produces a mixture 23 of nitrogen and of carbon dioxide, which is discharged to the atmosphere, the methane having been burnt off.

This avoids discharging methane, which is a gas with a strong greenhouse effect, into the atmosphere.

It is possible for the combustion gases 23 to be at least partly recovered, in which case the absence of methane facilitates their recovery.

In periods of low load, a part 19 of the gas 9 or all of the gas 9 may be recycled into the cryogenic separation.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A helium purification process, comprising the steps of:
   separating, by partial condensation and/or distillation at a partial condensation process and/or distillation process, respectively, a feed stream that contains at least 10% of helium, at least 10% of nitrogen in addition to hydrogen and methane, and which contains no carbon dioxide or only contains carbon dioxide as minor component, to form a helium-enriched stream containing hydrogen, a first stream enriched in nitrogen and in methane, and a second stream enriched in nitrogen and in methane;

sending the helium-enriched stream to a catalytic unit in the presence of oxygen to reduce its hydrogen content;

treating the helium-enriched to at least partly remove water generated by catalysis in the catalytic unit;

purifying, by adsorption in a first adsorption unit, the helium-enriched stream from which at least part of the water has been removed to produce a helium-rich gas comprising at least 95 mol % of helium and a helium-depleted residual gas containing water;

separating the helium-depleted residual gas containing water by adsorption in a second adsorption unit to remove the water, thereby producing a residual gas from which water is removed;

sending the first stream enriched in nitrogen and in methane to a combustion unit to participate in combustion thereof, thereby producing combustion gases that are discharged to the atmosphere or recovered;

sending the second stream enriched in nitrogen and in methane, as regeneration gas, to the second adsorption unit, thereby producing a spent regeneration gas; and sending the spent regeneration gas to the combustion unit to participate in combustion thereof.

2. The process of claim 1, further comprising the step of sending the residual gas to the partial condensation process and/or distillation process.

3. The process of claim 2, wherein the residual gas and the feed stream are compressed upstream of the partial condensation process and/or distillation process in a same compressor.

4. The process of claim 1, wherein the first and second streams have a same composition.

5. The process of claim 1, wherein the feed stream contains at least 30 mol % of helium.

6. The process of claim 5, wherein the feed stream contains at least 40 mol % of helium.

7. The process of claim 1, wherein the second stream contains at least 85 mol % of nitrogen.

8. The process of claim 1, wherein the second stream contains at least 1 mol % of methane.

9. The process of claim 1, in which the first adsorption unit is a pressure swing adsorption unit.

10. The process of claim 1, in which the second adsorption unit is a temperature swing adsorption unit.

11. A helium purification unit, comprising:

a separation unit for separation by partial condensation and/or by distillation;

a catalytic unit adapted and configured to receive a helium-enriched stream from the separation unit and reduce a hydrogen content thereof in the presence of oxygen;

a cooling unit adapted and configured to receive, from the catalytic unit, the hydrogen-reduced helium-enriched stream, the cooling unit further being adapted and configured to at least partly remove water from the hydrogen-reduced helium-enriched stream, by condensation thereof, that is generated by catalysis in the catalytic unit;

a first adsorption unit adapted and configured to receive an at least partially water-removed and hydrogen-reduced helium-enriched stream from the cooling unit, the first adsorption unit being a pressure swing adsorption unit, the first adsorption unit being further adapted and configured to produce, from the at least partially water-removed and hydrogen-reduced helium-enriched stream, a helium-rich gas comprising at least 95 mol % of helium and a helium-depleted residual gas containing water;

a second adsorption unit adapted and configured to: a) receive helium-depleted residual gas from the first adsorption unit, b) separate the helium-depleted residual gas containing water by adsorption remove water therefrom, thereby producing a residual gas from which water is removed, and c) receive a second stream enriched in nitrogen and in methane from the separation unit, as regeneration gas, and produce a spent regeneration gas, the second adsorption unit being a temperature swing adsorption unit; and a combustion unit adapted and configured to: a) receive a first stream enriched in nitrogen and in methane, from the separation unit, b) receive the spent regeneration gas, c) producing combustion gases from combustion of the first stream and the spent regeneration gas, and d) discharge the combustion gases to the atmosphere or allow the combustion gases to be recovered.

* * * * *

UNITED STATES PATENT AND TRADEMARK OFFICE
CERTIFICATE OF CORRECTION

PATENT NO. : 11,021,366 B2
APPLICATION NO. : 16/894205
DATED : June 1, 2021
INVENTOR(S) : Erwan Le Guludec and Antoine Hernandez It is certified that error appears in the above-identified patent and that said Letters Patent is hereby corrected as shown below:

On the Title Page

Please insert:
--(30) Foreign Application Priority Data
Jun. 6, 2019 (FR) ........................1906005--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*